United States Patent [19]

Inagaki et al.

[11] Patent Number: 4,739,856

[45] Date of Patent: Apr. 26, 1988

[54] WHEEL SLIP CONTROL SYSTEM FOR A VEHICLE

[75] Inventors: Takafumi Inagaki, Toyota; Kazumasa Nakamura, Okazaki; Isao Yoshikawa, Toyota, all of Japan

[73] Assignee: Toyota Jidosha Kabushiki Kaisha, Japan

[21] Appl. No.: 936,498

[22] Filed: Dec. 1, 1986

[30] Foreign Application Priority Data

Dec. 28, 1985 [JP] Japan .................... 60-298219

[51] Int. Cl.⁴ ............................................. B60K 31/00
[52] U.S. Cl. ...................................... 180/197; 303/103; 364/426
[58] Field of Search ................. 180/197; 303/103; 364/426; 123/335, 334

[56] References Cited

U.S. PATENT DOCUMENTS

| | | | |
|---|---|---|---|
| 3,776,357 | 12/1973 | Arai et al. | 180/197 |
| 3,938,612 | 2/1976 | Boudeville | 180/197 |
| 4,648,663 | 3/1987 | Nomura et al. | 180/197 |

Primary Examiner—John A. Pekar
Attorney, Agent, or Firm—Parkhurst & Oliff

[57] ABSTRACT

Wheel slip control system of the present invention controls an output of an internal combustion engine during acceleration of a vehicle and controls a hydraulic braking device of a driven wheel during acceleration of the vehicle, determines a value representative of a cumulative time control of the hydraulic braking device is effected and compares the value with a predetermined value, and changes selectively the output control of the internal combustion engine and the control of the hydraulic device in accordance with the comparison to thereby control driven wheel speed within a predetermined range such that a maximum torque is obtained.

8 Claims, 10 Drawing Sheets

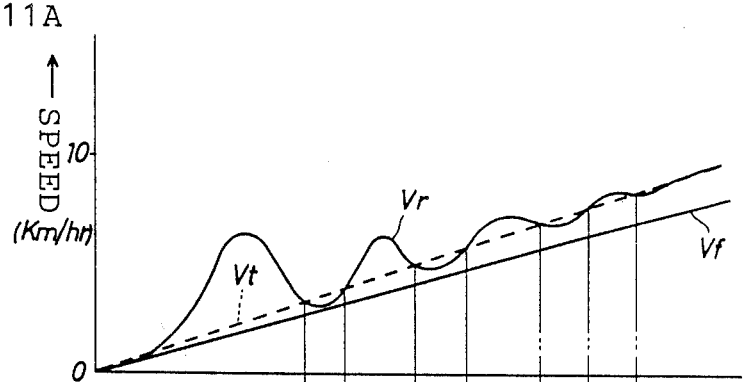
FIG. 11A
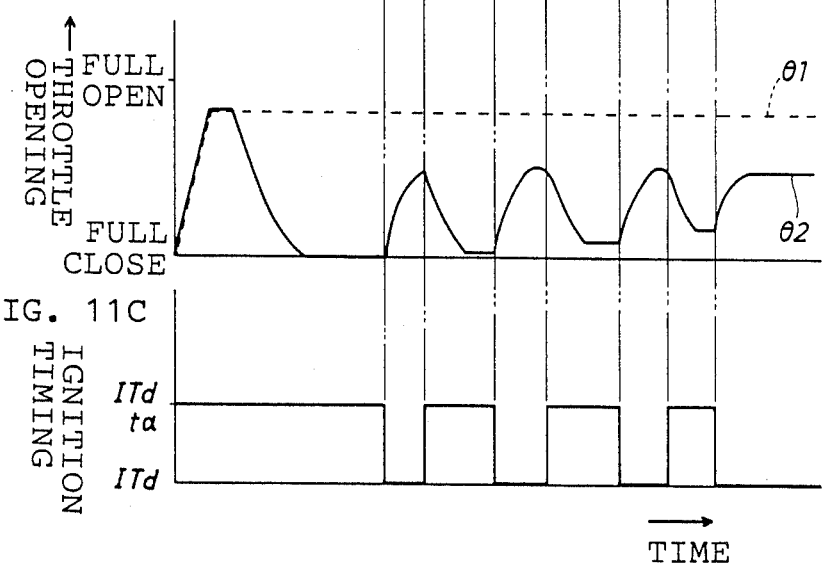
FIG. 11B
FIG. 11C

WHEEL SLIP CONTROL SYSTEM FOR A VEHICLE

BACKGROUND OF THE INVENTION

1. Technological Field

The present invention relates to a wheel slip control system for a vehicle in which the power of an internal combustion engine is controlled in order to control the rotational speed of driven wheels as well as to control the hydraulic braking system for driven wheels during acceleration slip.

2. Prior Art

Various kinds of wheel slip control devices for vehicles which control the slip of wheels during acceleration have been proposed and developed. In such a device, it is considered that the power control of the internal combustion engine is adjusted via a sub-throttle valve or a linkless throttle valve provided other than a main throttle valve, connected to an accelerator upon generation of acceleration slip regardless of an operation of the accelerator. Direct control is applied to use the hydraulic braking system installed in the vehicle. Other means, for example, indirect control is adapted to use the delay of ignition timing, thus the driven wheel speed is controlled within an optimal range, thereby preventing the acceleration slip.

However, the wheel slip control systems mentioned above are still inert, and the following problems remain unsolved. The prior wheel slip control system having the subthrottle valve or the linkless throttle valve cannot reduce the torque immediately, due to residual air in an intake pipe, even if the systems begin to close the throttle valve upon sensing acceleration slip, thus the above-mentioned time delay results in over-control.

The prior braking systems for preventing acceleration slip are not sufficient for controlling the wheel speed and require a specific apparatus. If the gear position is in first gear and the driving force is great, extremely high pressure is required to provide a braking force against the driving force. Furthermore, high durability is required for brake pads, and the special brake system having high brake power is required, since the braking system generates high heat due to the great consumption of energy.

In the ignition control to prevent the slip, the delay of rising and dropping in engine torque is less than that of the above-mentioned sub-throttle valve system. The special braking system is not required, however, such a control is not as effective on the surface of a low frictional coefficient such as muddy, icy and snowy roads because of the narrow control range of the engine torque.

SUMMARY OF THE INVENTION

It is therefore an object of the present invention to provide a wheel slip control system for a vehicle which executes either a brake control or an output control appropriately.

It is another object of the present invention to provide a wheel slip control system for a vehicle which elects a brake control in response to the request for a quick control of a driven wheel speed, for example, in the case of an initial period of acceleration slip or a high slip ratio.

It is still another object of the present invention to provide a wheel slip control system for a vehicle, in which a brake control directly controls a driven wheel speed upon an acceleration slip being sensed, to thereby improve response.

It is another object of the present invention to provide a wheel slip control system for a vehicle which elects an output control in the absence of the request for a quick response.

It is a further object of the present invention to provide a wheel slip control system for a vehicle which utilizes a prior art brake control means with ordinary durability.

Referring to FIG. 1 a wheel slip control system of the present invention for a vehicle including output control means M2 for controlling an output of an internal combustion engine M1 during acceleration of the vehicle and brake control means M4 for controlling a hydraulic braking device of a driven wheel M3 during acceleration of the vehicle, determination means M5 for determining a value representative of a number of times of a control of the hydraulic braking device and comparing the number with a predetermined value, and change means responsive to the determination means M5 for changing selectively the output control of the internal combustion engine and the control of the hydraulic device in accordance with the comparison to thereby control a driven wheel speed within such a predetermined range that a maximum torque is obtained.

Slip control means (M2, M4) compute the slip ratio of the driven wheel M3 based upon the driven wheel speed and the vehicle speed depending upon the non-driven wheel speed, and control the driven wheel speed in order to maintain the slip ratio about 20% where the rotational speed is maximum.

The output control means M2 controls the driven wheel speed by controlling the output power of the internal combustion engine M1 such as the control of the throttle valve opening or the ignition timing.

The throttle valve for adjusting the output power does not link the accelerator pedal provided at the intake pipe such as the linkless throttle valve or the sub throttle valve provided at the upstream or downstream of the main throttle valve. The ignition timing control for the output control adjusts the triggered timing of the vacuum advance device of a distributor or an electronic spark device. Brake control means M4 controls the driven wheel speed by adjusting the brake pressure. A braking device adjusts the brake pressure to thereby control the driving power of the driven wheel. For example, such a device includes a master cylinder in addition to the brake master cylinder associated with a brake pedal.

The above-mentioned predetermined number of determination means M5 is determined by the number of times (hereinafter referred to as a time count), for processing the slip control within a predetermined range, for example 5. The determination means M5 determines if the time count exceeds the predetermined range. The present system selectively changes the output control and the brake control. If the vehicle is determined to suffer from non-acceleration slip, the time count is reset, and again starts to count up every time the acceleration generates. If the time count is greater than a predetermined number, it is determined that the slip ratio is within the predetermined range and the brake control is not required so that the output control means M2 controls the output power of internal combustion engine M1. If the time count is less than the predetermined number, it is determined that the acceleration slip is in initial condition so that the brake control means M4 controls the hydraulic braking device.

These and other objects and advantages of the invention will become more apparent upon reference to the following, specification, attendant claims, and drawings.

BRIEF DESCRIPTION OF THE DRAWINGS

FIGS. 11 A, B, C and 12 A, B, C, D are time charts illustrative of a relationship between the wheel speed and the throttle opening, etc.

DESCRIPTION OF THE PREFERRED EMBODIMENT

Figure 1:
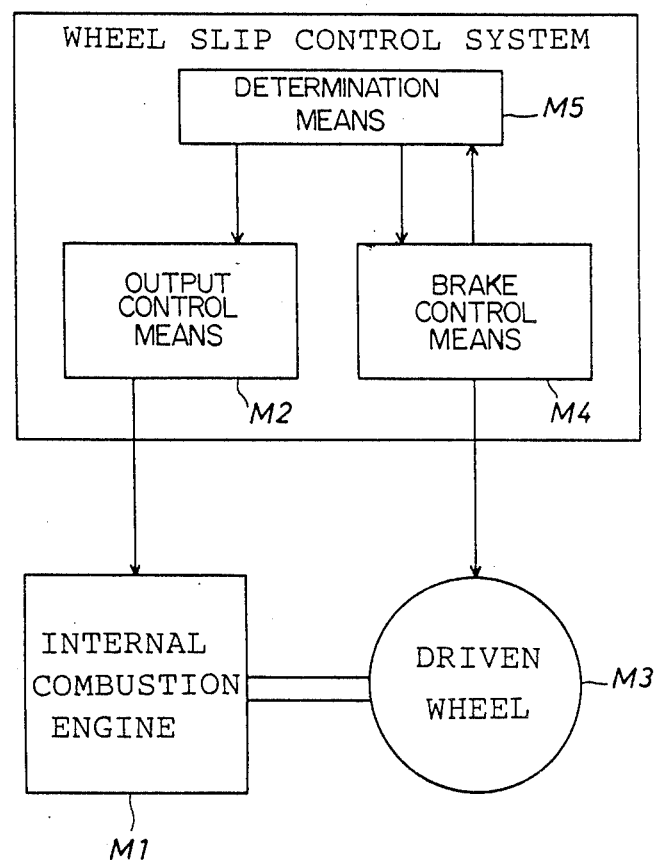
FIG. 1 is a diagram of a wheel slip control system according to the present invention.
Figure 2:
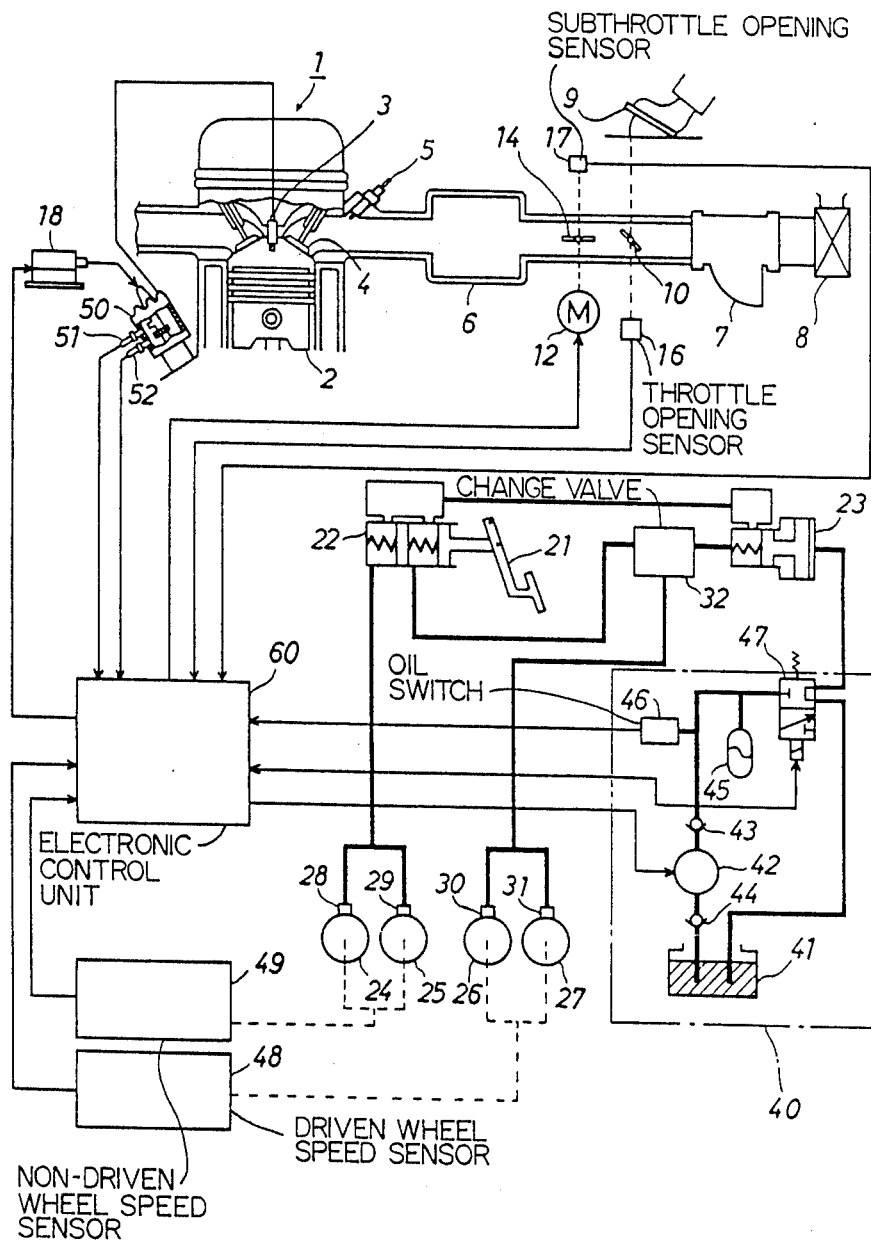
FIG. 2 is a diagram mainly showing the hydraulic device of the wheel slip control system of the first embodiment according to the present invention.

Embodiments of the present invention will now be described with reference to the drawings. Referring to FIG. 2 showing generally a first embodiment of the wheel slip control system, numeral 1 designates an internal combustion engine, numeral 2 designates a piston, numeral 3 designates a spark plug, numeral 4 designates an intake valve, numeral 5 designates a fuel injection valve, numeral 6 designates a surge tank, numeral 7 designates an airflow meter, and numeral 8 designates an air cleaner. A first throttle valve ( a main throttle valve ) 10, which is provided at an air passage between the meter 7 and the surge tank 6, connects to an accelerator pedal 9 to control an air intake amount. A second throttle valve ( a sub-throttle valve ) 14 which is also provided at the above-mentioned air passage is driven by a DC motor 12 in order to adjust the intake air amount. A main throttle opening sensor 16 senses the opening of the first throttle valve 10 and provides a first opening signal theta representative thereof. Similarly a sub throttle opening sensor 17 senses the opening of the second throttle valve 14 and provides a second opening signal theta representative thereof. An ignition coil 18 supplies a high voltage to the spark plug 3.

An arrangement includes a brake pedal 21, a brake master cylinder 22 for providing a brake hydraulic pressure in response to a displacement of the brake pedal 21, a submaster cylinder 23 for providing a brake hydraulic pressure upon sensing acceleration slip, non-driven right and left wheels 24 and 25 of the vehicle, driven right and left wheels 26 and 27, and wheel cylinders 28-31 provided at the wheels 24-27.

The brake master cylinder 22 is a type of tandem master cylinder assembly, supplying brake oil pressure to the wheel cylinders 28 and 29 on the non-driven wheels 24 and 25 in one hydraulic system, and to the wheel cylinders 30 and 31 of the driven wheels 26 and 27 in another. The brake oil pressure produced by the sub-master cylinder 23 is used for braking the driven wheels 26 and 27, and whether this brake hydraulic pressure or that produced by the brake master cylinder 22 is supplied by means of the sub master cylinder 23 to the wheel cylinders 30 and 31 is determined by a change valve 32. The change valve 32 has the structure of a shuttle valve, thus supplying the higher of the above two hydraulic pressures to the wheel cylinders 30 and 31.

A hydraulic system 40 supplies the pressure provided by the sub master cylinder 23 and includes an oil pump 42 pumping out the oil flowing into the system from a reservoir tank 41, check valves 43,44 preventing the oil from flowing backward, an accumulator 45 accumulating the oil with pressure as energy source for actuating the sub master cylinder 23, an oil switch 46 turning to an "on" condition in the case that the hydraulic pressure which is supplied from the oil pump 42 to the accumulator 45 drops below a predetermined pressure, a two position valve 47 being changed to such a position that hydraulic pressure accumulated at the accumulator 45 is supplied to the sub master cylinder 23. The two position valve 47 is a solenoid operated valve in which the valve position is changed from normal position supported by a spring to the other position upon receipt of the drive signal. A driven-wheel speed sensor 48 is provided on an output shaft of a transmission (not shown) and senses the driven wheel speed Vr which is the average speed of the driven wheels 26 and 27, a non-driven wheel speed sensor 49 is provided on an axis of the non-driven wheels for sensing the non-driven wheel speed Vf which is the average speed of the non-driven wheels 28 and 29.

An ignition system of the engine 1 includes the ignition coil 18 which outputs a high voltage for ignition and a distributor 50 to which a crank shaft (not shown) connects and through which the high voltage of the igniter 18 is distributed to each spark plug 3 of each cylinder. The distributor 50 includes a crank angle sensor 51, which functions as a speed sensor, and a cylinder discrimination sensor 52. The crank angle sensor 51 generates a crank angle signal every one twenty-fourth rotation of the cam shaft of the distributor 50, that is, every thirty degrees of the rotation of the crank shaft. The cylinder discrimination sensor 52 generates a reference signal every one rotation of the cam shaft of the distributor 51, that is, every two rotations of the crank shaft (not shown).

An electronic control unit 60 receives the signals from the sensors 16,17,48,49,51,52, switch 46, and airflow meter 7 and increases the hydraulic pressure of the driven wheels 26,27 and executes the opening and closing of the sub throttle valve 14 and executes the delay of the ignition timing upon sensing the acceleration slip to thereby reduce the output power of the engine 1 and suppress the speed of the driven wheels 26,27. In addition the control unit 60 develops the hydraulic control process of driving the oil pump 42 to hold the hydraulic pressure to a constant value.

Figure 3:
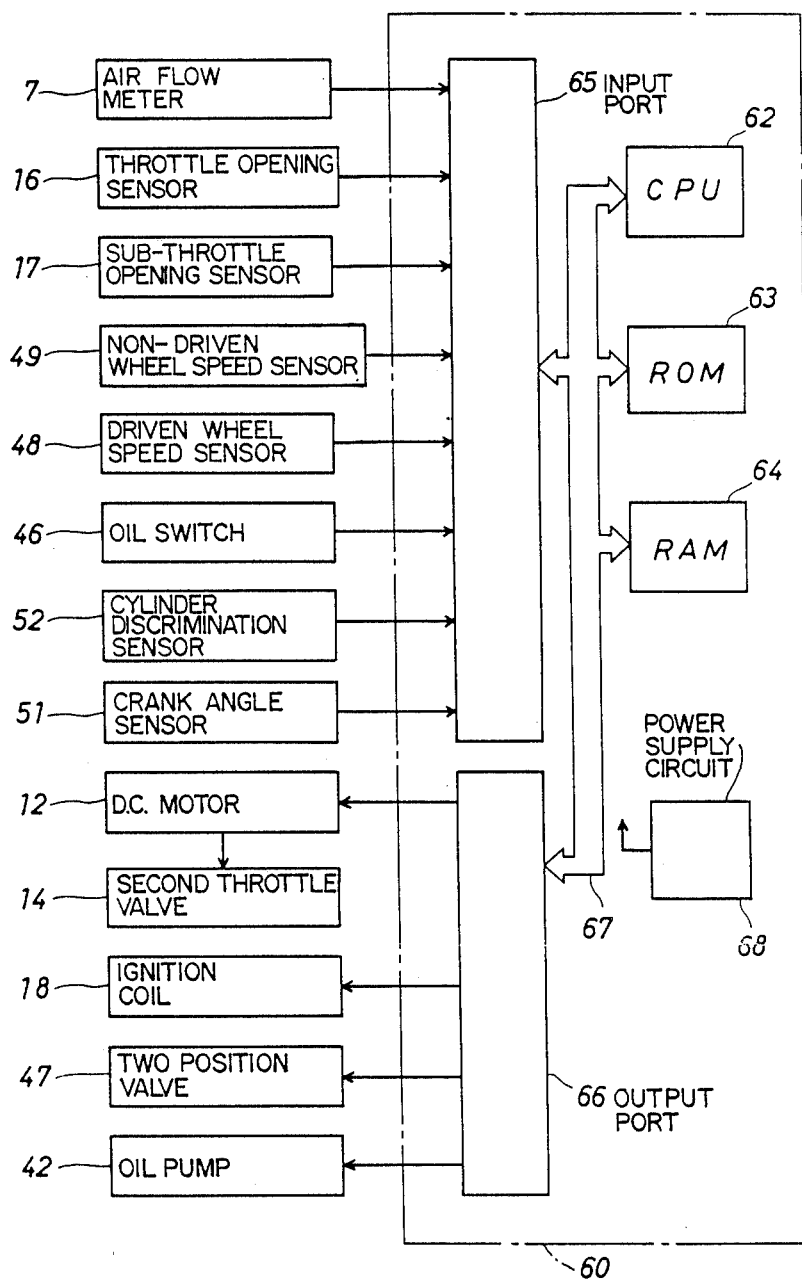
FIG. 3 is a diagram showing the electronic control circuit 30 in FIG. 2 according to the first embodiment.

Referring to FIG. 3, the unit 60 includes a central processing unit (CPU) 62 which receives and computes the datum from the sensor 16,17,48,49,51,52, the oil switch 46 and the airflow meter 7 to thereby control the oil pump 42, the two position valve 47, the ignition coil 18, and the DC motor 12 in accordance with the control program, a read only memory (ROM) 63 in which the control program and the datum such as tables are stored, a random access memory (RAM) 64 in which the datum from the sensors and the datum necessary for the control are temporarily stored, an input port 65 which has a multiplexer selectively outputting the output signals from the various sensors and which has the wave shape circuit to the CPU 62, an output port 66 which has a drive circuit driving the ignition coil 18, the oil pump 42, two position valve 47, and the DC motor 12 in response to the control signal of the CPU 62, a busline 67 which connects the abovementioned elements 62,63,64,65,and 66 and the various datum passes therebetween, and a power supply circuit 68 which supplies the voltage to elements.

FIG. 4 through FIG. 7 illustrate flowcharts indicating the acceleration slip and hydraulic pressure control executed by the control circuit 60.

Figure 4:
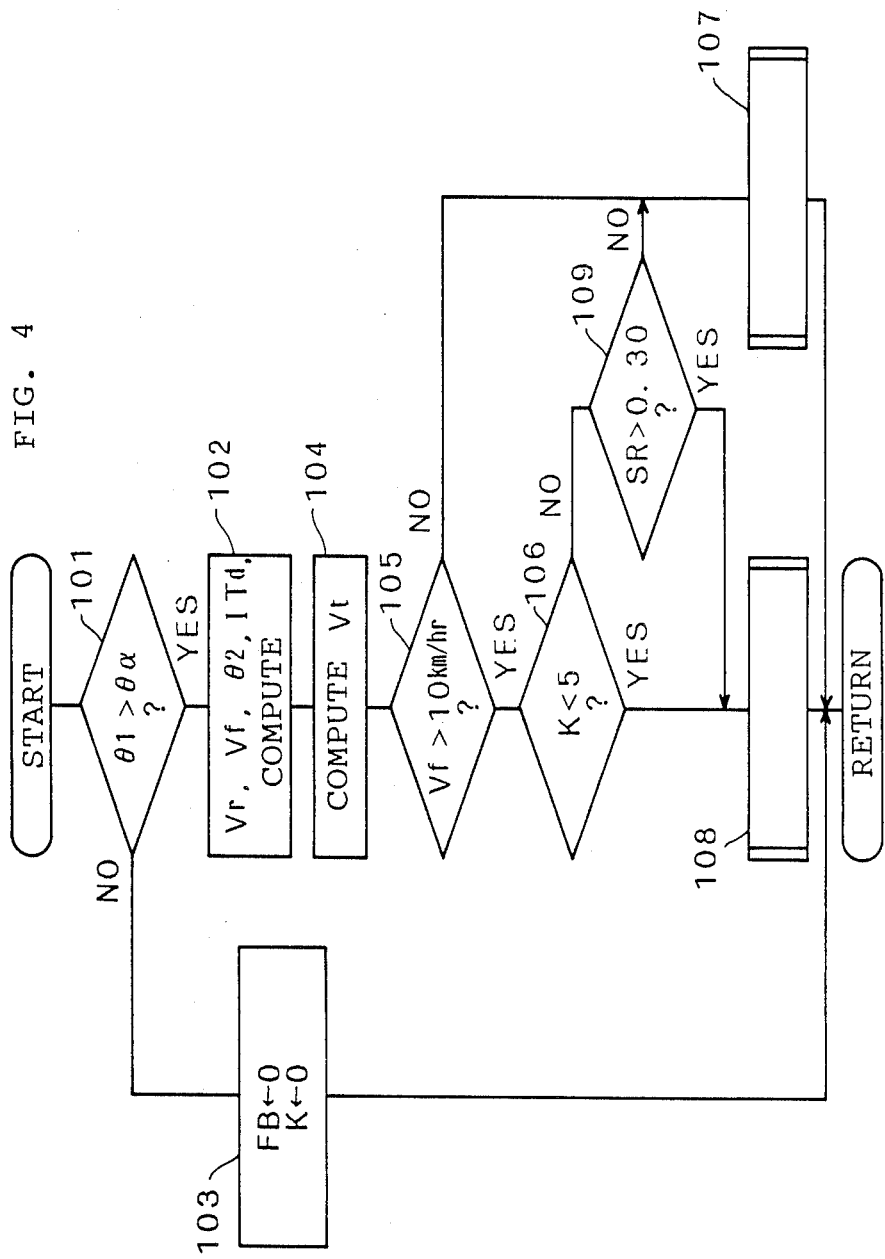
FIG. 4 is a flowchart illustrative of a control program of the first embodiment.

FIG. 4 illustrates the acceleration slip control in which the rotational speed of the driven wheels 26 and 27 are controlled by a two position valve 47, the DC motor 12 or the ignition timing. At step 101, the determination as to whether the vehicle is in acceleration is made in accordance with the signal from the main throttle opening sensor 16. Namely, it is determined that the vehicle is in acceleration if the throttle opening theta-1 is greater than a predetermined opening theta-alpha. If the determination is NO, the program proceeds to step 103 where a brake flag FB and a counter K for a time count are initialized and the program is terminated. If the determination is YES at step 101, the program proceeds to step 102 where the driven wheel speed Vr, the non-driven wheel speed Vf, the sub-throttle valve opening theta-2 and the optimum ignition timing ITd are computed in accordance with the signals from the sensors 17,48a,49b,51 and the meter 7, etc. At step 104, a reference wheel speed Vt is computed based upon the computed non-driven wheel speed Vf. The speed Vt, which is compared with the speed Vr in order to determine whether the acceleration slip generates later in the program, is computed as follows.

$$Vt = 1.2 \times Vf$$

where
Vt is the reference wheel speed
Vf is the non-driven wheel speed
the coefficient 1.2 is such a predetermined value that an optimum acceleration and a maximum frictional force between the wheel and the road surface during acceleration are obtained by controlling the slip ratio in the vicinity of 20%.

At step 105, the determination is made as to whether the speed Vf is greater than 10 Km/hr. If the determination is NO, the program proceeds to the step 107 where the output control of the internal combustion engine starts. If the determination is YES, at step 106 the determination is made as to whether a number of times of the control K (hereinafter described as a control time count) is less than five. If the comparison is YES, the program proceeds to step 108, on the other hand, if the comparison is NO, the program proceeds to step 109.

At step 109, it is determined whether or not the slip ratio SR is greater than 0.30. The slip ratio SR is computed as follows.

$$SR = |Vr - Vf|/Vf$$

If the slip ratio SR is greater than 0.30 at step 109, the program proceeds to step 108. If the slip ratio is less or equal to 0.30, the program proceeds to step 107 where the output control is executed.

Figure 5:
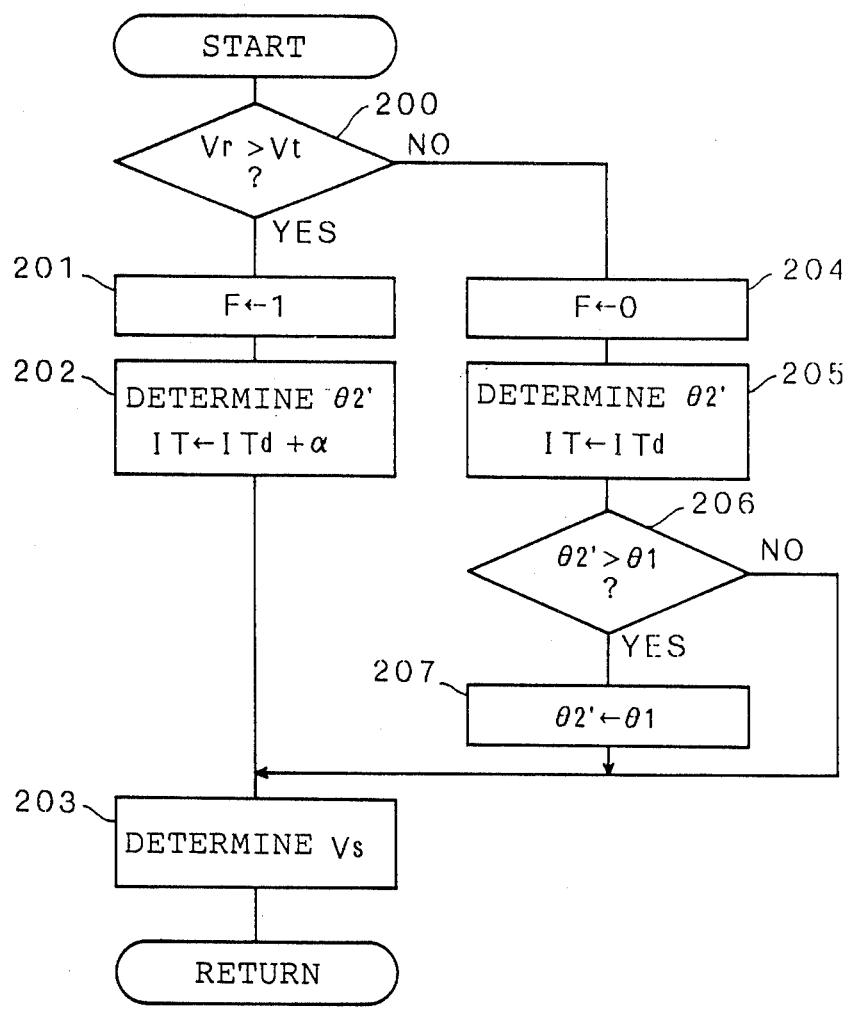
FIG. 5 is a flowchart illustrative of a control program of a slip control for an output control of the first embodiment.
Figure 8:
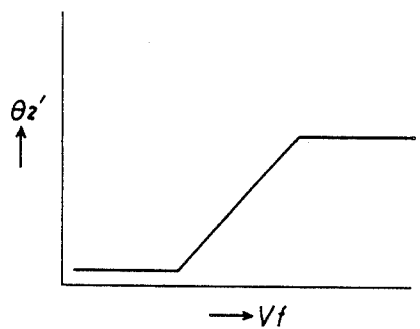
FIG. 8 is a table A for an acceleration slip control.

Referring to FIG. 5, after step 107, the program proceeds to step 200 where it is determined whether or not the driven wheel speed Vr computed at step 102 is greater than the reference wheel speed Vt, namely the slip ratio at which a tire is spinning is greater than 20%. In the case of Vr>Vt at step 201, a flag F representative of such a condition that the DC motor 12 controls the sub throttle valve 14 toward the closed position is set. After step 201, at step 202, a table A as shown in FIG. 8 indicating a relationship between the non-driven wheel speed Vf and a desired opening theta-2' is provided, and the ignition timing IT is delayed with a predetermined amount alpha to get an optimum ignition timing ITd. After step 202, the program proceeds to step 203.

Figure 9:
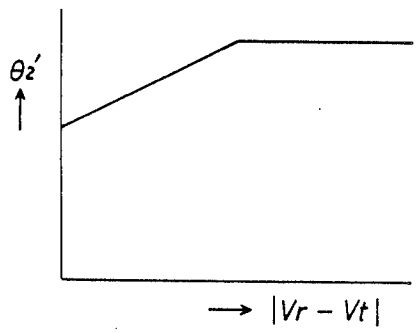
FIG. 9 is a table B for the acceleration slip control.

If Vr=<Vt, namely the absence of acceleration slip of the driven wheel is determined, the program proceeds to step 204 where the flag F is reset. At step 205, a table B as shown in FIG. 9 indicating a relationship between the difference (Vr−Vt) and a desired opening theta-2' is provided and the ignition timing IT is set at an optimum ignition timing ITd. At step 206, it is determined whether or not the opening theta-2' is greater than the main throttle valve opening theta-1. If the determination is YES, the program proceeds to step 207 where a desired opening theta-2' is set at theta-1. After step 207, the program proceeds to step 203. If it is determined that theta-2'=<theta-1, the program jumps directly from step 206 to step 203.

The steps 205 through 207 are added so as to improve the response when the acceleration slip is again sensed because of the full throttle opening of the sub-throttle valve 14 upon the operation of the sub-throttle valve 14 during non-acceleration slip. These steps function to control the opening of the sub-throttle valve 14 when the acceleration slip is assumed to occur and to control the desired opening theta-2' not to exceed the throttle opening theta-1.

Figure 10:
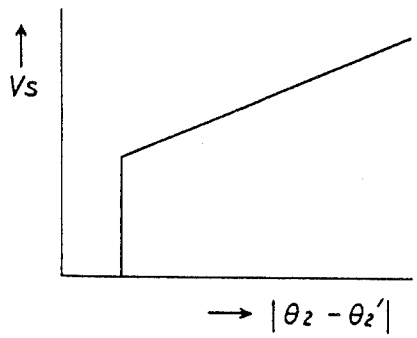
FIG. 10 is a table C for the acceleration slip control.
Figure 12A:
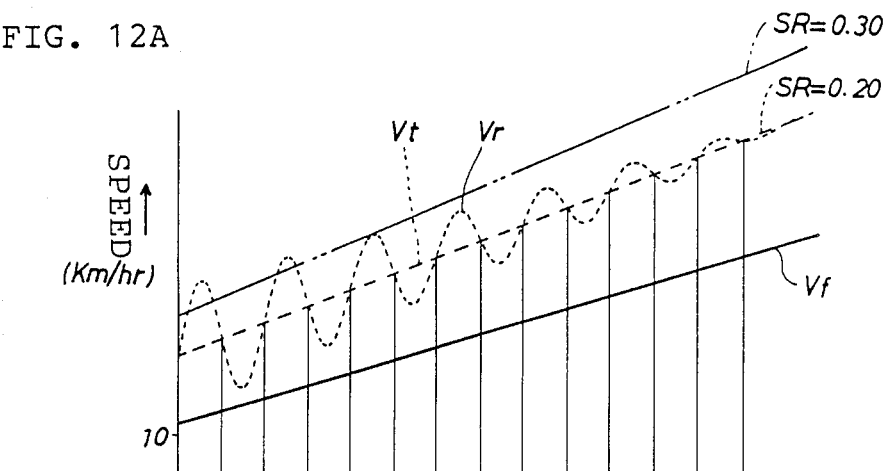
Figure 12B:
Figure 12C:
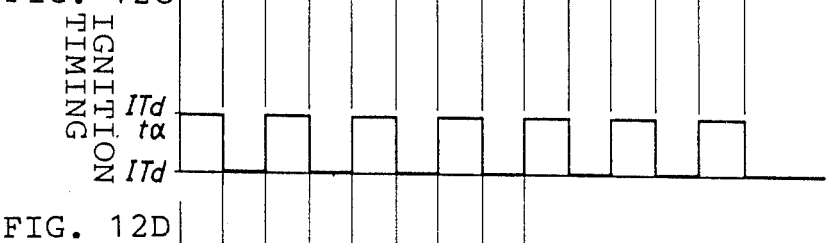
Figure 12D:
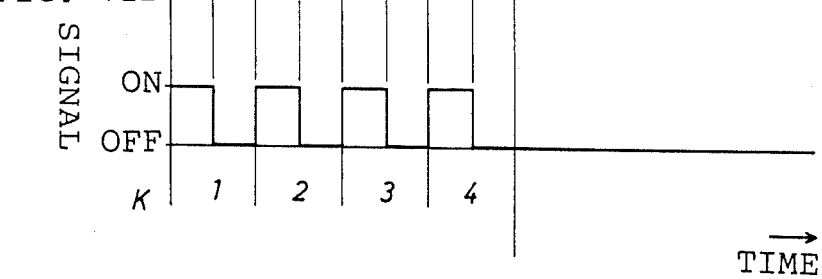

After step 202 or 207, the program proceeds to step 203 where the desired theta-2' is compared with the sub throttle opening theta-2, and where a rotational speed Vs of the DC motor 12 is determined in accordance with the abovementioned comparison and a table C as shown in FIG. 10.

Figure 6:
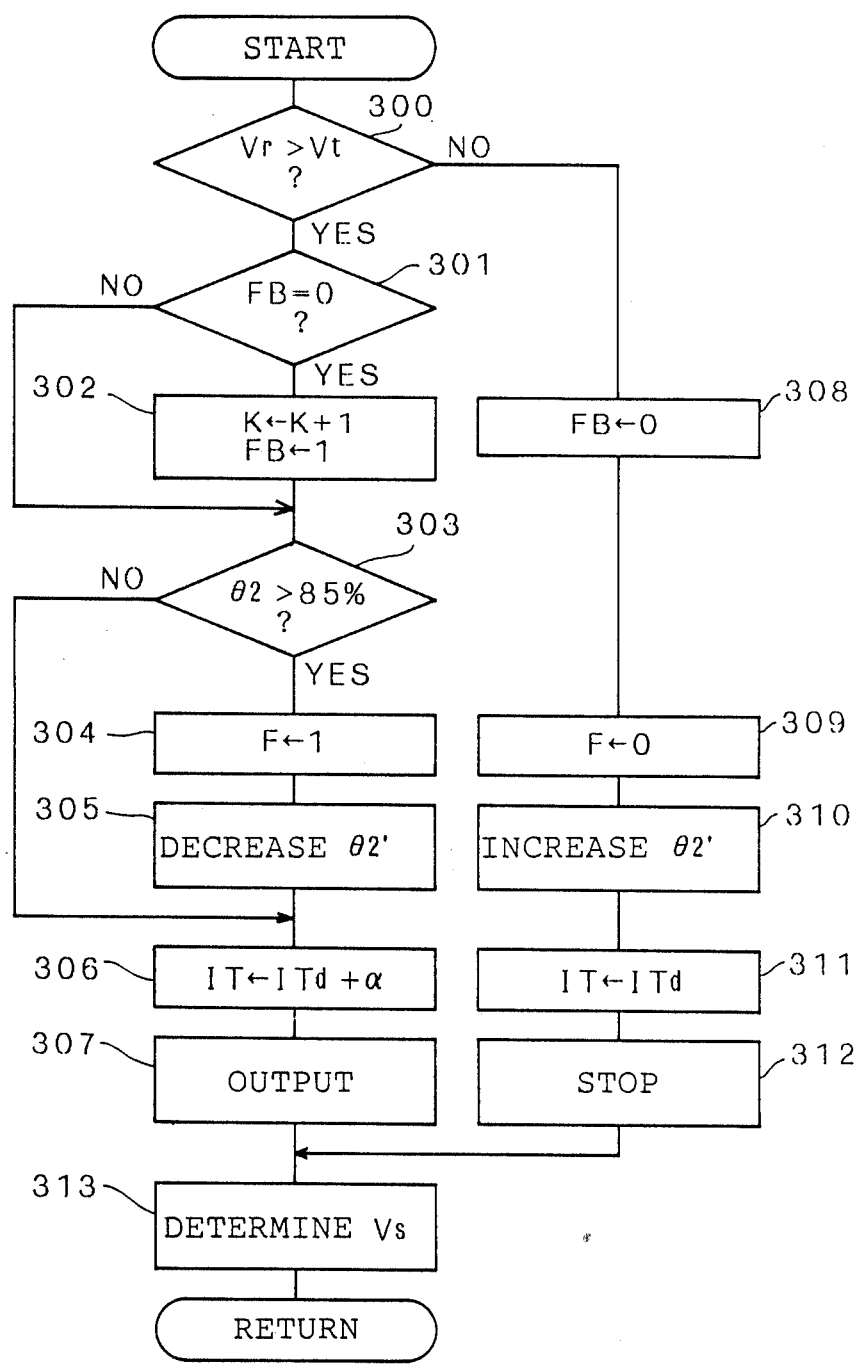
FIG. 6 is a flowchart illustrative of a control program for a brake control of the first embodiment.

FIG. 6 illustrates the slip control 108, which is executed after step 106 or 109 as shown in FIG. 4. The program proceeds to step 300 where the similar determination as step 200 is executed. In the case of Vr>Vt, the program proceeds to step 301 where it is determined whether or not a brake flag FB is zero. If the determination is YES, the program proceeds to step 302 where the counter K is increased by one and the brake flag FB is set and then proceeds to step 303. If the determination is NO, the program proceeds directly to step 303 where it is determined that the opening theta-2 of the sub-throttle valve 14 is greater than 85%. If the determination is YES, the program proceeds to step 304 where the flag F is set and then proceeds to step 305 where the desired throttle opening theta-2' is decreased by one. If the determination is NO at step 303 or after step 305 the program proceeds to step 306 where the ignition timing IT is made equal to the optimum timing ITd plus the delay alpha. From step 306 the program proceeds to step 307 where the two position valve 47 is activated in accordance with the drive signal, to thereby generate the brake pressure and control the driven wheel.

If the determination is NO at step 300, the program proceeds directly to step 308 where the brake flag FB is reset, then proceeds to step 309 where the flag F is reset, and proceeds to step 310 where the desired opening theta-2' is increased by one and then proceeds to step 311 where the ignition timing IT is made equal to the optimum ignition timing ITd, and then proceeds to step 312 where the two position valve 47 is set at inactive position wherein the brake hydraulic pressure is not generated by the spring in the absence of the drive signal to thereby release the driven wheel from the braking device. From step 307 or 312, the program proceeds to step 313 where the rotational speed of the DC motor Vs is determined in accordance with the table C similar as described at step 203.

Figure 7:
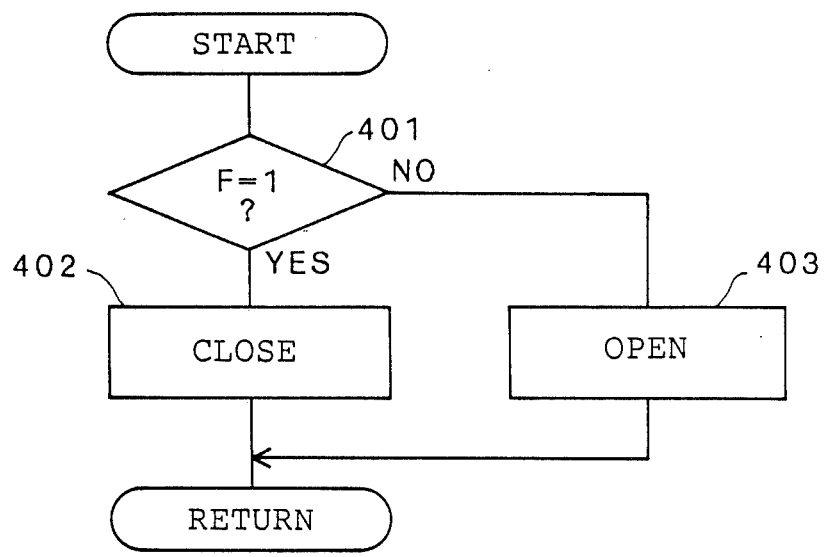
FIG. 7 is a flowchart illustrative of a control program of a DC motor of the first embodiment.

Referring to FIG. 7, a DC motor control routine is executed. In this routine, the sub-throttle valve 14 is opened or closed by the DC motor 12 in response to the rotational speed Vs and the flag F. This interrupt routine is repeated at a predetermined spaced interval. At step 401, it is determined whether or not the flag F is set. This flag is representative of a condition such that the sub throttle valve 14 is driven toward the closed position during the generation of the acceleration slip. If it is determined that the flag is set at step 401, the program proceeds to step 402 where the sub-throttle valve 14 is driven by the DC motor 12 toward the closed position in response to the rotational speed Vs set at step 203 or 313. If it is determined that the flag is reset at step 401, the program proceeds directly to step 403 where the sub-throttle valve 14 is opened by the DC motor 12 in response to the speed Vs similarly to step 402. When the speed Vs is zero, the DC motor is not driven.

FIGS. 11A–C and FIGS. 12A–D illustrate a time response characteristic of the driven wheel speed Vr, the non-driven wheel speed Vf and the reference wheel speed Vt, the throttle openings theta-1 and theta-2, ignition timing IT and ITd, and the drive signal of the two position valve. FIGS. 11A–C represent the characteristic where the non-driven wheel speed Vf is less or equal to 10 Km/hr, and FIGS. 12A–D represent the characteristic where the non-driven wheel speed Vf is greater than 10 Km/hr. In the FIGS. 11A–C, the characteristic of the drive signal of the two position signal is omitted because the characteristic thereof is unchanged.

Referring to FIGS. 11A–C and FIGS. 12A–D, it can be seen that the brake control is executed only if the quick control of the driven wheel is required, for example, during the initial period of the acceleration slip ($K<5$), during a high slip ratio, or when the vehicle speed is greater than 10 Km/hr. Therefore, the prior device which has ordinary level of durability can be applied. Concerning the output control of the slip control, the sub-throttle valve 14 is closed in response to the desired throttle opening theta-2' determined based upon the non-driven wheel speed Vf (vehicle speed) during acceleration where the driven speed Vr exceeds the reference wheel speed to thereby suppress the generation of the great engine brake and attain the smooth control of the engine output. Because the rotational speed of the DC motor 12 which opens and closes the sub throttle valve 14 is determined in response to the difference between the sub throttle valve opening theta-2 and the desired opening theta-2, the sub-throttle valve 14 is closed quickly during a great acceleration slip, on the other hand, closed slowly during a small acceleration. Accordingly, the smooth opening and closing of sub throttle valve can be obtained, and the overcontrol of the opening theta-2 can be prevented. In addition, the sub-throttle valve opening theta-2 during non-acceleration slip is not fully open, and controlled in response to the slip ratio, and controlled to the angle less than the main throttle valve opening theta-1, to thereby control the sub-throttle valve opening theta-2 quickly toward the desired opening theta-2' upon the acceleration slip. In addition, the quick output control can be obtained upon the acceleration slip since the ignition timing is also delayed.

Although throttle valves provided at the intake system of the internal combustion engine as previously described include the main throttle valve 10 connected to the accelerator pedal and the sub-throttle valve 14 driven by the DC motor 12 to prevent the acceleration slip, it is noted that, in another embodiment not shown here, a linkless throttle valve system can be equipped such that a linkless throttle valve can be directly controlled without the sub-throttle valve so that the system can be simplified. Although the change between the output control and the brake control is effected by not only the control time count but the wheel speed and slip ratio as previously described, the same effect thereof can be obtained with respect to the case in which the above-mentioned change depends upon the control time count only.

While preferred embodiments of the invention have been described using specific terms, such description is for illustrative purposes only, and it is to be understood that changes and variations may be made without departing from the spirit or scope of the following claims.

What is claimed is:

1. A wheel slip control system for a vehicle comprising:
    output control means for controlling an output of an internal combustion engine during acceleration of the vehicle,
    brake control means for controlling a driven wheel hydraulic braking device during acceleration of the vehicle,
    determination means for determining a value representative of a cumulative time that control of said hydraulic braking device is effected and comparing said value with a predetermined value, and
    change means responsive to said determination means for changing selectively said output control of said internal combustion engine and said control of said hydraulic braking device in accordance with said comparison to thereby control a driven wheel speed within a predetermined range such that wheel slip is minimized.

2. The wheel slip control system for a vehicle according to claim 1 wherein said change means elects said output control of the internal combustion engine if said value is greater than said predetermined value.

3. The wheel slip control system for a vehicle according to claim 1 wherein said change means elects said control of said hydraulic braking device if said value is less than said predetermined value.

4. The wheel slip control system for a vehicle according to claim 1 wherein, said output control of the internal combustion engine is operable to adjust a throttle valve.

5. The wheel slip control system for a vehicle according to claim 1 wherein, said output control of the internal combustion engine is operable to adjust an ignition timing.

6. The wheel slip control system for a vehicle according to claim 1 wherein, said hydraulic braking device includes a master cylinder connected to brake means and a sub master cylinder.

7. The wheel slip control system for a vehicle according to claim 1 wherein, said value is updated upon every generation of said acceleration slip.

8. The wheel slip control system for a vehicle according to claim 1 wherein, said value is reset when said driven wheel speed falls in said predetermined range.

* * * * *